Figure 1:
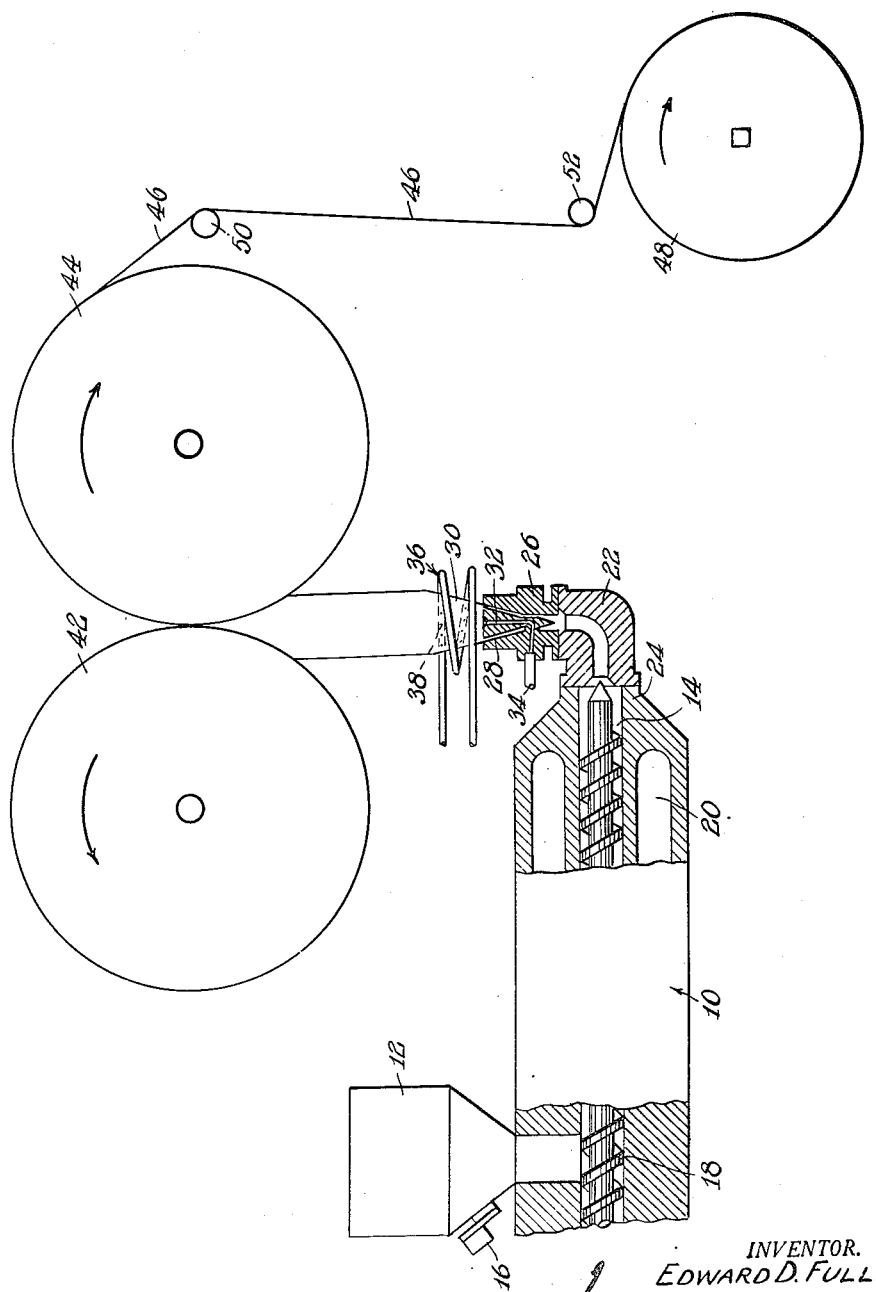

Feb. 15, 1949.  E. D. FULLER  2,461,975
METHOD OF MAKING FLATTENED THERMOPLASTIC TUBING
OF PREDETERMINED DESIRED CHARACTERISTICS
Filed Oct. 20, 1945  2 Sheets-Sheet 1

INVENTOR.
EDWARD D. FULLER
BY
Wm S Pritchard
ATTORNEY.

Feb. 15, 1949.  E. D. FULLER  2,461,975
METHOD OF MAKING FLATTENED THERMOPLASTIC TUBING
OF PREDETERMINED DESIRED CHARACTERISTICS
Filed Oct. 20, 1945  2 Sheets-Sheet 2
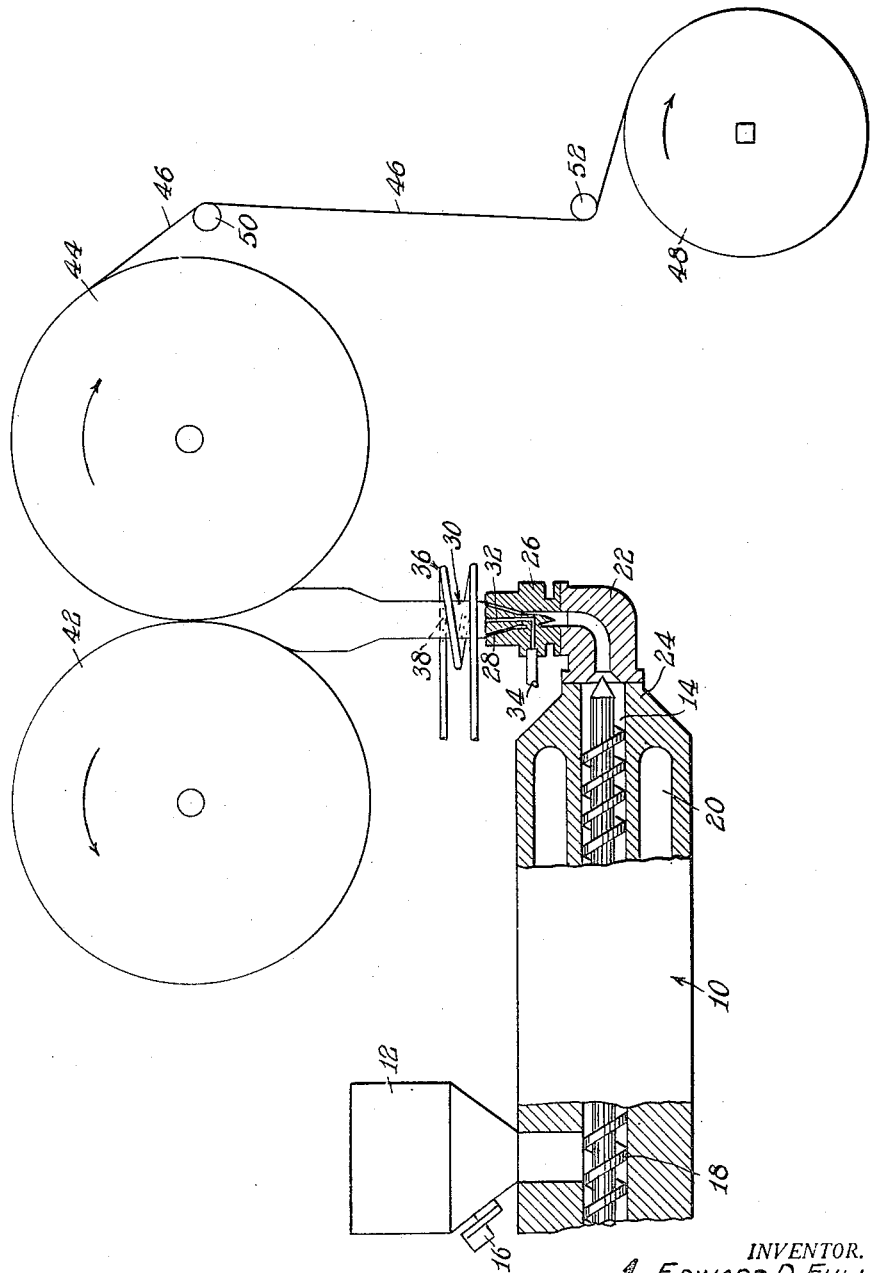
INVENTOR.
EDWARD D. FULLER
BY
ATTORNEY.

Patented Feb. 15, 1949

2,461,975

UNITED STATES PATENT OFFICE 2,461,975

METHOD OF MAKING FLATTENED THERMO-PLASTIC TUBING OF PREDETERMINED DESIRED CHARACTERISTICS

Edward D. Fuller, Chicago, Ill., assignor to The Visking Corporation, Chicago, Ill., a corporation of Virginia Application October 20, 1945, Serial No. 623,470

18 Claims. (Cl. 18—57)

This invention relates to tubing and more particularly to a new and improved dry process for producing thin-walled continuous seamless tubing of predetermined characteristics from thermoplastic organic materials.

An object of this invention is to provide a new and improved dry method of preparing thin-walled continuous seamless tubing from a melt of a thermoplastic organic material.

Another object of this invention is to provide a dry method of preparing thin-walled continuous seamless tubing of predetermined characteristics from a melt of a thermoplastic organic material.

Other and additional objects will become apparent hereinafter.

The objects of this invention are accomplished, in general, by dry extruding a thermoplastic organic material from a melt thereof through an annular die to form a seamless tubing, and, as the tubing is being drawn from the die and while it is in the formative plastic state, inflating the tubing to a predetermined diameter and setting the expanding tubing at approximately the point where said tubing has reached the desired final diameter.

The term "formative plastic state" is used herein to define that state of the plastic wherein the plastic is in the unset or partly set condition and can be permanently enlarged as by stretching.

The drawing of the tubing from the die is obtained by a pair of squeeze rolls which also serve to collapse the inflated tubing into the form of a ribbon, in which condition it is wound up on a wind-up reel. The squeeze rolls may be driven at a speed that stretches the tubing while in the plastic formative stage, thus affecting the physical properties of the tubing. Hence, the peripheral speed of the squeeze rolls is selected so that, in combination with the other controlled variables of the process, tubing of predetermined characteristics is obtained.

The inflation of the tubing is obtained by a gaseous medium introduced into the interior of the tubing. The inflating medium is entrapped or confined between the nip of the draw rolls and the die through which the molten thermoplastic is extruded. As a result, the inflating medium comprises an isolated gaseous bubble which advances bodily, while remaining substantially constant in quantity, through the successive portions of the tubing withdrawn from the die by the draw rolls. The quantity of the gaseous medium constituting the entrapped or confined inflating medium (isolated bubble) is selected so that the extruded tubing, while still in the formative plastic stage, will be expanded so that diameter necessary to produce the predetermined desired flat width when the tubing is flattened by the squeeze rolls. The expansion of the tubing also affects the physical properties of the film constituting the tubing and, therefore, the other variables in the process are correlated therewith so as to produce a tubing of predetermined flat width and other predetermined characteristics.

As will hereinafter be more fully explained, the final diameter of the tubing can be obtained in the vicinity of the die or in the vicinity of the draw rolls. In either embodiment, when the tubing in the formative plastic state has been expanded to the desired diameter, the thermoplastic is set, i. e. converted to that state which resists and is not further expanded by the isolated gaseous bubble. It is to be noted that the amount of internal air pressure, produced by the isolated gaseous medium and required to stretch the tubing in the formative plastic state, is less than the amount of pressure required to stretch a set tubing. When the tubing is expanded by internal air pressure while in the formative plastic state, the tubing will permanently acquire that diameter to which it has been inflated.

In the preferred form of this invention, the tubing is converted from the formative plastic state to the set condition by directing and applying a controlled volume of an external air flow on and around the tubing while in the formative plastic state. The cooling by air of the tubing in the formative plastic state is regulated in accordance with volume and temperature of the air so that the inflation of the tubing while in the formative plastic state can be effected either near the lips of the die or near the draw rolls as desired. The control of the point of inflation of the tubing aids in controlling, within narrow tolerances, the flat width and wall thickness of the finished tubing. It also permits control of the structural characteristics of the tubing (orientation).

In the manufacture of thermoplastic tubing by the process of this invention, the following dimensions and properties of the finished tubing are capable of variation and can be controlled:

1. Flat width of the tubing;
2. Thickness of the tubing;
3. Machine—direction properties: structural characteristics of the tubing (i. e., tear resistance, tensile strength, etc.);
4. Transverse—direction properties; structural characteristics of the tubing (i. e., tear resistance, tensile strength, etc.).

As will hereinafter become more apparent, the desired dimensions and physical properties of the tubing are predetermined and the variables in the process are adjusted to produce the desired results.

The process is not restricted to any particular apparatus. It, for example, can be carried out in an apparatus such as that shown in the accompanying drawings, wherein Figure 1 is a diagrammatic side elevation (with the extruder in partial section) of an apparatus wherein the inflation of the tubing to the desired diameter is obtained in the vicinity of the die; and Figure 2 is a diagrammatic side elevation of an apparatus similar to that shown in Figure 1, but wherein the inflation of the tubing to the desired diameter is obtained in the vicinity of the squeeze rolls.

Referring now to the drawings wherein like reference numerals disclose like parts, the reference numeral 10 designates an extruder provided at one end thereof with a feed hopper 12 which feeds the selected thermoplastic into the screw chamber 14 of the extruder. An electric vibrator 16 of known construction cooperates with the hopper 12 to accelerate the feed of the thermoplastic material into the extruder. In the screw chamber 14 there is positioned a single-threaded pitch screw 18 which, upon rotation, advances the thermoplastic through the extruder. The screw 18 is rotated in the known manner by means not shown. The extruder is provided with a jacketed chamber 20 through which a heating medium is circulated. The extruder thus far described is one known type of National thermoplastic extruders manufactured and sold by the National Rubber Machinery Corporation of Akron, Ohio.

As the thermoplastic material is fed by the screw 18 through the extruder previously explained, it is molten and in such condition is fed into a 90° elbow 22 bolted to the head 24 of the extruder. A die 26 is secured in any appropriate manner to the outlet end of the elbow 22 and the molten thermoplastic passes thereinto.

The die 26 is provided with an annular orifice 28 from which the molten mass emerges in the air as a hot gumlike viscous thermoplastic tubing 30. The die 26 is provided with a central orifice 32 which is connected to an air supply 34 whereby air is introduced interiorly of the tubing to inflate the same. The air supply 34 is provided with a valve, not shown, so that when the desired quantity of air has been introduced within the tubing further supply thereof can be prevented. In the event the quantity of the air decreases, as for example by leakage or otherwise, the requisite quantity of air can be added by proper manipulation of the valve.

The inflated tubing 30 is drawn upwardly and passes interiorly of a helical hollow coil 36. each spiral of which has a multiplicity of predetermined spaced perforations 38 of appropriate size. Cooling air is supplied to the coil 36 from both ends 37 thereof and it passes therefrom through the perforations 38 on to the exterior surface of the tubing. The stream of cooling air serves to chill or set the expanding plastic tube at approximately the point in its upward travel where it has reached the desired final diameter. In general, the tubing reaches its final diameter an inch or so above the final cooling orifice. Thereafter, the tubing which passes through the atmosphere of the room in which the apparatus is located is not subjected to any further expansion during the rest of its travel.

The inflated tubing is drawn from the die 26 in a substantially vertical direction through the cooling coil 36 and thence through the circumambient atmosphere by a pair of rotating squeeze rolls 42 and 44 which also serve to collapse the tubing passing therebetween into a flattened ribbon-like material. The flattened tubing, designated by the reference numeral 46, passes over the roll 44 and is wound up on a wind-up reel 48 driven by a torque motor (not shown). Intermediate the squeeze roll 44 and the wind-up reel 48, guide rolls 50 and 52 serve to direct the flattened tubing 46 from the squeeze roll 44 to the wind-up reel 48.

The inflating air is introduced in an amount such as is necessary to expand or inflate the tubing while in the formative plastic state to a predetermined desired final diameter. After such a quantity of air has been introduced into the system, the valve controlling further supply is cut off and the air is sealed within the section of the tubing extending between the nip of the squeeze rolls 42 and 44 and the molten thermoplastic in the annular orifice 28. As the molten thermoplastic is extruded from the die orifice in the form of a seamless tubing, it is drawn vertically upwardly by the squeeze rolls 42 and 44. As soon as the molten thermoplastic leaves the die orifice, it is subjected to the inflating medium which expands the tubing to the desired predetermined diameter. While the tubing is being expanded, it is passed interiorly of the spirals of the coil 36 and the cooling medium supplied thereby impinges on substantially the entire exterior surface of the tubing in the formative plastic state exposed thereto. The quantity of the cooling air, the temperature thereof, and the pressure thereof, are such that the thermoplastic material will be converted from the formative plastic state to a set condition at the time when the tubing has been inflated to the predetermined desired diameter and which, in Figure 1, is in the neighborhood of approximately 1 inch above the uppermost spiral of the coil 36.

In Figure 1, the cooling coil 36 is positioned close to the die 26 and the expansion of the tubing while in the formative plastic state to the predetermined desired diameter is secured quickly. After the final diameter has been obtained, the thermoplastic constituting the tubing being in a set condition, the tubing is not subjected to any further expansion or drawing.

Though it is preferred to secure the expansion of the tubing to the predetermined desired diameter in the vicinity of the die as previously explained, the invention is not restricted thereto. Alternatively, the expansion of the tubing to the desired final diameter can be obtained anywhere between the face of the die and the nip of the draw rolls, and Figure 2 illustrates an embodiment wherein the tubing is expanded to the predetermined desired final diameter in the vicinity of the squeeze rolls 42 and 44. This is obtained by utilizing such a quantity of air and of such pressure and temperature as will partially (surface only) but not wholly cool (set) the extruded tubing. The tubing will thus be capable of further expansion even though some cooling has been done. The formative plastic tubing will, all things being equal, tend to expand most easily at its thinnest point. Since the tubing is being drawn by the squeeze rolls 42 and 44, it is also acquiring a machine direction, linear expansion as it is being pulled upwardly, the film becoming thinner and thinner as it is drawn toward the squeeze rolls. The film thus reaches its least (and final) thickness just before contact with the draw rolls. The result is that the air pressure within the formative plastic tube expands the tubing at a point in the vicinity of the squeeze rolls since at that point it is the thinnest.

In carrying out the process of this invention, the selected thermoplastic is introduced into the extruder and the feed screw rotated at a certain speed whereby the thermoplastic in the molten state is extruded through the annular orifice of an appropriately selected die. The extruded material which is in the form of seamless tubing is then passed between the nip of the squeeze rolls. Air is introduced into the portion of the tubing extending between the die and nip of the draw rolls in the amount required to inflate the tubing to the desired diameter. This is determined by increasing or decreasing the amount of air as is indicated upon measurement of the flat width of the collapsed tubing. The quantity of the cooling air, depending on the place in the upward path of travel of the tubing where the tubing is to be set, is next determined. The amount of cooling air, while it is fairly constant for a particular set of conditions, is subject to change in accordance with changes in the following variables:

1. Speed of upward travel of the extruded tubing;
2. Air temperature of (external) cooling air;
3. Humidity of external cooling air;
4. Room temperature;
5. Temperature of the extruded material;
6. Specific heat of the thermoplastic.

It is to be noted that in the process hereinbefore generally described, the internal air pressure, the volume of external air, and the diameter of the die, are balanced against each other (all the other variables being maintained constant) as is necessary to produce tubing of predetermined characteristics.

The details and manner of practicing the invention will be apparent from the following specific examples, it being understood that these examples are merely illustrative embodiments of the invention and that the scope of the invention is not restricted thereto.

*Example I*

To produce a tubing 8" in flat width and 0.003" in (wall) thickness, whose tensile strength in the machine direction is approximately equal to its tensile strength in the transverse direction, and whose tear resistance in the machine direction is approximately equal to its tear resistance in the transverse direction.

Molten polyethylene was extruded in an apparatus of the type shown in Figure 1 at the rate of 17.5 pounds per hour through a die having an annular orifice of .018" and 2½" in diameter (between the inner lip thereof), the temperature of the polyethylene at the lips being 270°–290° F. The extruded tubing was withdrawn upwardly in a vertical direction from the die at the rate of 15' per minute by the draw rolls positioned 20" above the die. Sufficient air necessary to inflate the tubing while in the plastic formative state to a final diameter of 5.1" which, upon flattening, will produce a flat width of 8", was introduced interiorly of the tubing through the air inlet 34. When this quantity of air had been introduced, the supply thereof was cut off and the air within the tubing comprised an isolated bubble which was sealed in the tubing between the top of the die and the nip of the squeeze rolls. As soon as the tubing was withdrawn from the die, the gaseous bubble began to inflate the tubing. The tubing was drawn through the zone of action of the cooling coil 36 which was positioned in close proximity to the die so that the air in the lowermost spiral thereof impinged on the tubing when the latter was approximately 1" from the die. A large amount of air at room temperature (26° C.), such as at least 122,000 cubic inches per minute, was applied by the coil 36 to the outer circumference of the upwardly advancing tubing at the approximate point in its upward travel where it was desired to set the tubing and thus prevent further expansion. The tubing, which started to expand by reason of the internally applied air as soon as it left the lips of the die, was expanded to its final desired diameter within 9 or 10", or so, of its upward travel, and the stream of external cooling air set the expanding tube at approximately the point in its upward travel where it reached its final diameter.

In general, the tubing reached its final diameter an inch or so above the final cooling holes.

After the tubing had passed out of the zone of action of the cooling air, it passed through an unconfined circumambient atmosphere which, in this example, was the atmosphere of a room.

*Example II*

To produce a tubing 8" in flat width and 0.003" in (wall) thickness whose tensile strength in the machine direction is higher than its tensile strength in the transverse direction and whose tear resistance in the transverse direction is greater than its tear resistance in the machine direction.

The procedure and conditions are the same as those described in Example I, except that a smaller amount of room temperature (26° C.) air, such as less than 40,000 cubic inches per minute, was applied by the coil 36 to the outer circumference of the upwardly advancing tubing.

This quantity of air did not wholly set the extruded tubing but only a part (surface only) thereof. Thus, the tubing was still in the formative plastic state and capable of further easy expansion even though some cooling had taken place.

All things being equal, a tubing in the formative plastic state tends to expand at its thinnest point. As the tubing was being drawn by the squeeze rolls, it was acquiring a machine direction linear expansion, the film becoming thinner and thinner as it was drawn upwardly. The film reached its least (and final) thickness just before contact with the draw rolls, at which point the air pressure of the confined bubble expanded the tube to the predetermined desired diameter.

*Example III*

To produce a tubing 8" in flat width and 0.003" in (wall) thickness whose tensile strength in the transverse direction is higher than its tensile strength in the machine direction and whose tear resistance in the machine direction is greater than its tear resistance in the transverse direction.

The procedure and conditions are the same as those described in Example I, except that a die having an annular orifice 0.018" wide and being 1" in diameter (between the inner lips) was utilized.

It is apparent that this procedure is substantially the method of Example I in all particulars except that, due to the utilization of a smaller die, the tubing is expanded to a greater degree whereby the desired properties are obtained.

In the examples, the relative humidity of the cooling air was 71% and the air volumes were of free air, i. e. air at atmospheric pressure.

The pressure of the air at the cooling coil affects the volume of air emerging therefrom, and this is used to obtain the volume of cooling air desired. In general, the pressure at the cooling coil is within the range of from 1 to 10 pounds per square inch, gauge pressure. If additional cooling air is desired, the pressure is increased and vice versa. Conventional pressure regulators are used for this purpose. In practice, compressed air is supplied to the cooling coil from a suitable source of supply where it is maintained under a pressure higher than that required at the cooling coil, such as 80 pounds per square inch, gauge pressure, which pressure is reduced and regulated by conventional pressure regulators to supply the air at the cooling coil at the desired pressure.

Though the specific examples describe the invention in connection with the production of seamless tubing of predetermined desired characteristics from polyethylene, it is to be understood that the invention is not restricted thereto. In general, the invention can be utilized with any thermoplastic material and mixture of synthetic rubbers with thermoplastic materials. Each thermoplastic substance or composition possesses certain properties which may make it necessary to determine, by experiment, the extent the variables have to be balanced in order to produce tubing of the desired results. This may be especially so with regard to the quantity of cooling air, since the temperature at the lips of the die may be different with different thermoplastic substances or compositions. Hereinafter, is set forth a list of illustrative thermoplastic materials which can be used in this invention, the temperatures of the melt at the lips of the die being also given:

| Material | Temperature of melt at lips of die |
|---|---|
| | (° F.) |
| Cellulose acetate | 360-380 |
| Cellulose acetate butyrate | 350-360 |
| Ethyl cellulose | 400-420 |
| Methyl methacrylate polymer | 470-490 |
| Nylon (extrusion or molding grade) | 475-525 |
| Polystyrene | 470-490 |
| Polyvinyl formal-acetate butyral | 300-340 |
| Copolymers of vinyl chloride and vinyl acetate (Vinylite) | 330-340 |
| Polyvinyl chloride (Geon) | 350-370 |
| Copolymers of vinyl chloride and vinylidene chloride (Saran) | 360-370 |

Though the results can be obtained when the temperature of the thermoplastic at the lips of the die is as above given, the temperature of the lips can be 85° higher than the melting point of the plastic used but not greater than 525° F.

The properties of the thermoplastic substance or composition can be modified as by the incorporation therein of suitable modifying agents, such as plasticizers, fillers, coloring agents, heat decomposition inhibitor, anti-oxidant, etc.

In the examples, the cooling coil was positioned about 1" from the face of the die and extended upward for approximately 6" to 7". However, the cooling coil can be positioned as close as possible to the die or spaced therefrom even as much as 3". The total height of the cooling coil or spirals is not restricted to any dimension. The total height is determined by the quantity of cooling air to be supplied, and the quantity of cooling air in turn depends on the specific thermoplastic being extruded.

In the examples, the internal air pressure, the volume of the cooling air of any appropriate temperature, and the diameter of the die, were balanced against each other to produce tubing of the predetermined desired characteristics while all the other conditions, such as, for example, screw speed, temperature of extrusion, speed of squeeze rolls, room temperature, width of die orifice, humidity of cooling air, etc., were maintained constant. Obviously, if one or more of the conditions which were maintained constant in the examples were varied, the internal air pressure, the volume of the cooling air, and the diameter of the die, would have to be further balanced to compensate for such variations. Such determination of the necessary conditions can, in accordance with the teachings of the instant invention, be determined by simple experiment. In general, however, since in any apparatus certain features thereof can be maintained constant, the three variables (internal air pressure, volume of cooling air and diameter of the die) are the most easily varied and controlled.

The invention has been described in connection with an inflating medium consisting of air. Since air is relatively cheap and available, it is preferred. However, any other gaseous medium which does not exert any deleterious effect on the tubing being produced can be used.

In the invention as hereinbefore specifically described, air at room temperature constituted the cooling medium. However, the invention is not restricted to such specific room temperature air, since the air can be previously chilled to a temperature lower than room temperature. Likewise, in place of air, either at room temperature or at a temperature lower than room temperature, other gaseous media which do not exert any deleterious effect on the tubing can be utilized. Furthermore, in place of the air cooling coil, some of the other known cooling systems may be utilized.

The invention herein described is particularly suitable for the production of thin-walled continuous tubing. Though, as shown by the examples, tubing having a wall thickness of 0.003" can be produced, tubing having a wall thickness as low as 0.0005" and as high as 0.020" or higher has also been produced.

In general, the width of the die orifice is not material. It should be of a width to provide the molten material in sufficient amount to produce the predetermined sized tubing.

The diameter of the die between the lips thereof is such that the tubing in the plastic formative stage can be expanded to a diameter of from 2 to 5 times the diameter of the die.

Though the method has been hereindescribed in connection with expanding the extruded tubing while in the formative plastic state to a diameter greater than the diameter of the die, the invention is not restricted thereto. The method can be utilized in the production of tubing of predetermined characteristics and of a diameter less than the diameter of the die. This is obtained by increasing the speed of the squeeze rolls and utilizing only sufficient internal air pressure to hold the tubing in the inflated condition at the desired diameter, it being understood, of course, that the tubing in the formative plastic state is subjected to cooling as hereindescribed.

In the preferred embodiment of the invention, the tubing is extruded in an upward direction. Though this is the preferred embodiment, the principles of the invention can also be utilized for extruding horizontally or downwardly.

The invention provides a method whereby tubing of predetermined desired size and physical characteristics can be obtained by appropriately controlling and regulating the variables in the process. Since in most apparatus certain conditions may be maintained constant, the desired results can be obtained if all conditions are maintained constant except the internal pressure, the volume of the cooling medium and the diameter of the die, and such variables are balanced against each other while the conditions are maintained constant as is necessary to produce the predetermined desired results.

Since it is obvious that various changes and modifications may be made in the above description without departing from the nature or spirit thereof, this invention is not restricted thereto except as set forth in the appended claims.

I claim:

1. In a method of producing flattened tubing of predetermined desired characteristics, the steps which comprise continuously dry-extruding a molten thermoplastic in the form of a seamless tubing, continuously withdrawing the tubing from the point of extrusion, flattening the tubing at a point spaced from the point of extrusion, maintaining a substantially constant continuous isolated bubble of a gaseous medium in the section of the tubing extending between the point of extrusion and the point of flattening, the quantity of the gaseous medium constituting said bubble being such as to inflate the tubing while in the formative plastic state to a predetermined desired diameter at a point beyond the point of extrusion, said predetermined diameter being different from that of the tubing at the point of extrusion, and passing the tubing while in the plastic formative state through streams of a cooling gaseous medium in the vicinity of the point of extrusion and impinging circumferentially on said tubing to chill the tubing to an extent that when the tubing has been inflated by said bubble to the said predetermined diameter it will be in a set condition, the rate of withdrawing the tubing, the degree of inflation of the tubing and the degree of chilling the tubing all being correlated in accordance with predetermined desired physical characteristics of the tubing.

2. In a method of producing flattened tubing of predetermined desired characteristics, the steps which comprise continuously dry-extruding a molten thermoplastic in the form of a seamless tubing, continuously withdrawing the tubing from the point of extrusion, flattening the tubing at a point spaced from the point of extrusion, maintaining a substantially constant continuous isolated bubble of a gaseous medium in the section of the tubing extending between the point of extrusion and point of flattening, the quantity of the gaseous medium constituting said bubble being such as to inflate the tubing while in the formative plastic state to a predetermined desired diameter at a point beyond the point of extrusion, said predetermined diameter being different from that of the tubing at the point of extrusion, and blowing a cooling gaseous medium onto the exterior surface of the tubing in the vicinity of the point of extrusion to chill said tubing to an extent that when the tubing has been inflated by said bubble to the said predetermined diameter it will be in a set condition, the rate of withdrawing the tubing, the degree of inflation of the tubing and the degree of chilling the tubing all being correlated in accordance with predetermined desired physical characteristics of the tubing.

3. In a method of producing flattened tubing of predetermined desired characteristics, the steps which comprise continuously dry-extruding a molten thermoplastic in the form of a seamless tubing, continuously withdrawing the tubing from the point of extrusion, flattening the tubing at a point spaced from the point of extrusion, maintaining a substantial constant continuous isolated bubble of a gaseous medium in the section of the tubing extending between the point of extrusion and point of flattening, the quantity of the gaseous medium constituting said bubble being such as to inflate the tubing while in the formative plastic state to a predetermined desired diameter at a point beyond the point of extrusion, said predetermined diameter being different from that of the tubing at the point of extrusion, and blowing, in the vicinity of the point of extrusion, air onto the exterior surface of the tubing in such volume that said tubing will be chilled to an extent that when the tubing has been inflated by said bubble to the said predetermined diameter it will be in a set condition, the rate of withdrawing the tubing, the degree of inflation of the tubing and the degree of chilling the tubing all being correlated in accordance with predetermined desired physical characteristics of the tubing.

4. In a method of producing flattened tubing of predetermined desired characteristics, the steps which comprise continuously dry-extruding a molten thermoplastic in a vertical upward direction in the form of a seamless tubing, continuously withdrawing the tubing from the point of extrusion, flattening the tubing at a predetermined distance above the point of extrusion, maintaining a substantially constant continuous isolated bubble of a gaseous medium in the section of the tubing extending upwardly between the point of extrusion and the point of flattening, the quantity of the gaseous medium constituting said bubble being such as to inflate the tubing while in the formative plastic state to a predetermined desired diameter at a point beyond the point of extrusion, said predetermined diameter being different from that of the tubing at the point of extrusion, and passing the tubing while in the plastic formative state through streams of a cooling gaseous medium in the vicinity of the point of extrusion and impinging circumferentially on said tubing to chill the tubing to an extent so that when the tubing has been inflated by said bubble to the said predetermined diameter it will be in a set condition, the rate of withdrawing the tubing, the degree of inflation of the tubing and the degree of chilling the tubing all being in accordance with predetermined desired physical characteristics of the tubing.

5. In a method of producing flattened tubing of predetermined desired characteristics, the steps which comprise continuously dry-extruding a molten thermoplastic in a vertical upward direction in the form of a seamless tubing, continuously withdrawing the tubing from the point of extrusion, flattening the tubing at a predetermined distance above the point of extrusion, maintaining a substantially constant continuous isolated bubble of a gaseous medium in the section of the tubing extending upwardly between the point of extrusion and the point of flattening, the quantity of the gaseous medium constituting said bubble being such as to inflate the tubing while in the formative plastic state to a predetermined desired diameter at a point beyond the point of extrusion, said predetermined diameter being different from that of the tubing at the point of extrusion, and blowing a cooling gaseous medium onto the exterior surface of the tubing in the vicinity of the point of extrusion to chill said tubing to an extent so that when the tubing has been inflated by said bubble to the said predetermined diameter it will be in a set condition, the rate of withdrawing the tubing, the degree of inflation of the tubing and the degree of chilling the tubing all being in accordance with predetermined desired physical characteristics of the tubing.

6. In a method of producing flattened tubing of predetermined desired characteristics, the steps which comprise continuously dry-extruding a molten thermoplastic in a vertical upward direction in the form of a seamless tubing, continuously withdrawing the tubing from the point of extrusion, flattening the tubing at a predetermined distance above the point of extrusion, maintaining a substantially constant continuous isolated bubble of a gaseous medium in the section of the tubing extending upwardly between the point of extrusion and the point of flattening, the quantity of the gaseous medium constituting said bubble being such as to inflate the tubing while in the formative plastic state to a predetermined desired diameter at a point beyond the point of extrusion, said predetermined diameter being different from that of the tubing at the point of extrusion, and blowing, in the vicinity of the point of extrusion, air onto the exterior surface of the tubing in such volume that said tubing will be chilled to an extent so that when the tubing has been inflated by said bubble to the said predetermined diameter it will be in a set condition, the rate of withdrawing the tubing, the degree of inflation of the tubing and the degree of chilling the tubing all being in accordance with predetermined desired physical characteristics of the tubing.

7. In a method of producing flattened tubing of predetermined desired characteristics, the steps which comprise continuously dry-extruding a molten thermoplastic in the form of a seamless tubing, continuously withdrawing the tubing from the point of extrusion, flattening the tubing at a point spaced from the point of extrusion, maintaining a substantially constant continuous isolated bubble of a gaseous medium in the section of the tubing extending between the point of extrusion and the point of flattening, the quantity of the gaseous medium constituting said bubble being such as to inflate the tubing while in the formative plastic state to a predetermined desired diameter at a point beyond the point of extrusion, said predetermined diameter being larger than the diameter of the tubing at the point of extrusion, and passing the tubing while in the plastic formative state through streams of a cooling gaseous medium in the vicinity of the point of extrusion and impinging circumferentially on said tubing to chill the tubing to an extent that when the tubing has been expanded by said bubble to the said predetermined diameter it will be in a set condition, the rate of withdrawing the tubing, the degree of expansion of the tubing and the degree of chilling the tubing all being correlated in accordance with predetermined desired physical characteristics of the tubing.

8. In a method of producing flattened tubing of predetermined desired characteristics, the steps which comprise continuously dry-extruding a molten thermoplastic in the form of a seamless tubing, continuously withdrawing the tubing from the point of extrusion, flattening the tubing at a point spaced from the point of extrusion, maintaining a substantially constant continuous isolated bubble of a gaseous medium in the section of the tubing extending between the point of extrusion and point of flattening, the quantity of the gaseous medium constituting said bubble being such as to inflate the tubing while in the formative plastic state to a predetermined desired diameter at a point beyond the point of extrusion, said predetermined diameter being larger than the diameter of the tubing at the point of extrusion, and blowing a cooling gaseous medium onto the exterior surface of the tubing in the vicinity of the point of extrusion to chill said tubing to an extent that when the tubing has been expanded by said bubble to the said predetermined diameter it will be in a set condition, the rate of withdrawing the tubing, the degree of expansion of the tubing and the degree of chilling the tubing all being correlated in accordance with predetermined desired physical characteristics of the tubing.

9. In a method of producing flattened tubing of predetermined desired characteristics, the steps which comprise continuously dry-extruding a molten thermoplastic in the form of a seamless tubing, continuously withdrawing the tubing from the point of extrusion, flattening the tubing at a point spaced from the point of extrusion, maintaining a substantially constant continuous isolated bubble of a gaseous medium in the section of the tubing extending between the point of extrusion and point of flattening, the quantity of the gaseous medium constituting said bubble being such as to inflate the tubing while in the formative plastic state to a predetermined desired diameter at a point beyond the point of extrusion, said predetermined diameter being larger than the diameter of the tubing at the point of extrusion, and blowing, in the vicinity of the point of extrusion, air onto the exterior surface of the tubing in such volume that said tubing will be chilled to an extent that when the tubing has been expanded by said bubble to the said predetermined diameter it will be in a set condition, the rate of withdrawing the tubing, the degree of expansion of the tubing and the degree of chilling the tubing all being correlated in accordance with predetermined desired physical characteristics of the tubing.

10. In a method of producing flattened tubing of predetermined desired characteristics, the steps which comprise continuously dry-extruding a molten thermoplastic in a vertical upward direction in the form of a seamless tubing, continuously withdrawing the tubing from the point of extrusion, flattening the tubing at a predetermined distance above the point of extrusion, maintaining a substantially constant continuous isolated bubble of a gaseous medium in the section of the tubing extending upwardly between the point of extrusion and the point of flattening, the quantity of the gaseous medium constituting said bubble being such as to inflate the tubing while in the formative plastic state to a predetermined desired diameter at a point beyond the point of extrusion, said predetermined diameter being larger than the diameter of the tubing at the point of extrusion, and passing the tubing while in the plastic formative state through streams of a cooling gaseous medium in the vicinity of the point of extrusion and impinging circumferentially on said tubing to chill the tubing to an extent so that when the tubing has been expanded by said bubble to the said predetermined diameter it will be in a set condition, the rate of withdrawing the tubing, the degree of expansion of the tubing and the degree of chilling the tubing all being in accordance with predetermined desired physical characteristics of the tubing.

11. In a method of producing flattened tubing of predetermined desired characteristics, the steps which comprise continuously dry-extruding a molten thermoplastic in a vertical upward direction in the form of a seamless tubing, continuously withdrawing the tubing from the point of extrusion, flattening the tubing at a predetermined distance above the point of extrusion, maintaining a substantially constant continuous isolated bubble of a gaseous medium in the section of the tubing extending upwardly between the point of extrusion and the point of flattening, the quantity of the gaseous medium constituting said bubble being such as to inflate the tubing while in the formative plastic state to a predetermined desired diameter at a point beyond the point of extrusion, said predetermined diameter being larger than the diameter of the tubing at the point of extrusion, and b'owing a cooling gaseous medium onto the exterior surface of the tubing in the vicinity of the point of extrusion to chill said tubing to an extent so that when the tubing has been expanded by said bubble to the said predetermined diameter it will be in a set condition, the rate of withdrawing the tubing, the degree of expansion of the tubing and the degree of chilling the tubing all being in accordance with predetermined desired physical characteristics of the tubing.

12. In a method of producing flattened tubing of predetermined desired characteristics, the steps which comprise continuously dry-extruding a molten thermoplastic in a vertical upward direction in the form of a seamless tubing, continuously withdrawing the tubing from the point of extrusion, flattening the tubing at a predetermined distance above the point of extrusion, maintaining a substantially constant continuous isolated bubble of a gaseous medium in the section of the tubing extending upwardly between the point of extrusion and the point of flattening, the quantity of the gaseous medium constituting said bubble being such as to inflate the tubing while in the formative plastic state to a predetermined desired diameter at a point beyond the point of extrusion, said predetermined diameter being larger than the diameter of the tubing at the point of extrusion, and blowing, in the vicinity of the point of extrusion, air onto the exterior surface of the tubing in such volume that said tubing will be chi'led to an extent so that when the tubing has been expanded by said bubble to the said predetermined diameter it will be in a set condition, the rate of withdrawing the tubing, the degree of expansion of the tubing and the degree of chilling the tubing all being in accordance with predetermined desired physical characteristics of the tubing.

13. In a method of producing flattened tubing of predetermined desired characteristics, the steps which comprise continuously dry-extruding a molten thermoplastic in the form of a seamless tubing, continuously withdrawing the tubing from the point of extrusion, flattening the tubing at a point spaced from the point of extrusion, maintaining a substantially constant continuous isolated bubble of a gaseous medium in the section of the tubing extending between the point of extrusion and the point of flattening, the quantity of the gaseous medium constituting said bubble being such as to inflate the tubing whi'e in the formative plastic state to a predetermined desired diameter at a point beyond the point of extrusion, said predetermined diameter being less than the diameter of the tubing at the point of extrusion, and passing the tubing while in the plastic formative state through streams of a coo'ing gaseous medium in the vicinity of the point of extrusion and impinging circumferentially on said tubing to chill the tubing to an extent that when the tubing has been inflated by said bubble to the said predetermined diameter it will be in a set condition, the rate of withdrawing the tubing, the degree of inflation of the tubing and the degree of chilling the tubing all being correlated in accordance with predetermined desired physical characteristics of the tubing.

14. In a method of producing flattened tubing of predetermined desired characteristics, the steps which comprise continuously dry-extruding a molten thermop'astic in the form of a seamless tubing, continuously withdrawing the tubing from the point of extrusion, flattening the tubing at a point spaced from the point of extrusion, maintaining a substantially constant continuous isolated bubble of a gaseous medium in the section of the tubing extending between the point of extrusion and point of flattening, the quantity of the gaseous medium constituting said bubble being such as to inflate the tubing while in the formative plastic state to a predetermined desired diameter at a point beyond the point of extrusion, said predetermined diameter being less than the diameter of the tubing at the point of extrusion, and blowing a cooling gaseous medium onto the exterior surface of the tubing in the vicinity of the point of extrusion to chill said tubing to an extent that when the tubing has been inflated by said bubble to the said predetermined diameter it will be in a set condition, the rate of withdrawing the tubing, the degree of inflation of the tubing and the degree of chilling the tubing all being correlated in accordance with predetermined desired physical characteristics of the tubing.

15. In a method of producing flattened tubing of predetermined desired characteristics, the steps which comprise continuously dry-extruding a molten thermoplastic in the form of a seamless tubing, continuously withdrawing the tubing from the point of extrusion, flattening the tubing at a point spaced from the point of extrusion, maintaining a substantially constant continuous isolated bubble of a gaseous medium in the section of the tubing extending between the point of extrusion and point of flattening, the quantity of the gaseous medium constituting said bubble being such as to inflate the tubing while in the formative plastic state to a predetermined desired diameter at a point beyond the point of extrusion, said predetermined diameter being less than the diameter of the tubing at the point of extrusion, and blowing, in the vicinity of the point of extrusion, air onto the exterior surface of the tubing in such volume that said tubing will be chilled to an extent that when the tubing has been inflated by said bubble to the said predetermined diameter it will be in a set condition, the rate of withdrawing the tubing, the degree of inflation of the tubing and the degree of chilling the tubing all being correlated in accordance with predetermined desired physical characteristics of the tubing.

16. In a method of producing flattened tubing of predetermined desired characteristics, the steps which comprise continuously dry-extruding a molten thermoplastic in a vertical upward direction in the form of a seamless tubing, continuously withdrawing the tubing from the point of extrusion, flattening the tubing at a predetermined distance above the point of extrusion, maintaining a substantially constant continuous isolated bubble of a gaseous medium in the section of the tubing extending upwardly between the point of extrusion and the point of flattening, the quantity of the gaseous medium constituting said bubble being such as to inflate the tubing while in the formative plastic state to a predetermined desired diameter at a point beyond the point of extrusion, said predetermined diameter being less than the diameter of the tubing at the point of extrusion, and passing the tubing while in the plastic formative state through streams of a cooling gaseous medium in the vicinity of the point of extrusion and impinging circumferentially on said tubing to chill the tubing to an extent so that when the tubing has been inflated by said bubble to the said predetermined diameter it will be in a set condition, the rate of withdrawing the tubing, the degree of inflation of the tubing and the degree of chilling the tubing all being in accordance with predetermined desired physical characteristics of the tubing.

17. In a method of producing flattened tubing of predetermined desired characteristics, the steps which comprise continuously dry-extruding a molten thermoplastic in a vertical upward direction in the form of a seamless tubing, continuously withdrawing the tubing from the point of extrusion, flattening the tubing at a predetermined distance above the point of extrusion, maintaining a substantially constant continuous isolated bubble of a gaseous medium in the section of the tubing extending upwardly between the point of extrusion and the point of flattening, the quantity of the gaseous medium constituting said bubble being such as to inflate the tubing while in the formative plastic state to a predetermined desired diameter at a point beyond the point of extrusion, said predetermined diameter being less than the diameter of the tubing at the point of extrusion, and blowing a cooling gaseous medium onto the exterior surface of the tubing in the vicinity of the point of extrusion to chill said tubing to an extent so that when the tubing has been inflated by said bubble to the said predetermined diameter it will be in a set condition, the rate of withdrawing the tubing, the degree of inflation of the tubing and the degree of chilling the tubing all being in accordance with predetermined desired physical characteristics of the tubing.

18. In a method of producing flattened tubing of predetermined desired characteristics, the steps which comprise continuously dry-extruding a molten thermoplastic in a vertical upward direction in the form of a seamless tubing, continuously withdrawing the tubing from the point of extrusion, flattening the tubing at a predetermined distance above the point of extrusion, maintaining a substantially constant continuous isolated bubble of a gaseous medium in the section of the tubing extending upwardly between the point of extrusion and the point of flattening, the quantity of the gaseous medium constituting said bubble being such as to inflate the tubing while in the formative plastic state to a predetermined desired diameter at a point beyond the point of extrusion, said predetermined diameter being less than the diameter of the tubing at the point of extrusion, and blowing, in the vicinity of the point of extrusion, air onto the exterior surface of the tubing in such volume that said tubing will be chilled to an extent so that when the tubing has been inflated by said bubble to the said predetermined diameter it will be in a set condition, the rate of withdrawing the tubing, the degree of inflation of the tubing and the degree of chilling the tubing all being in accordance with predetermined desired physical characteristics of the tubing.

EDWARD D. FULLER.

REFERENCES CITED

The following references are of record in the file of this patent:

UNITED STATES PATENTS

| Number | Name | Date |
|---|---|---|
| 2,027,962 | Currie | Jan. 14, 1936 |
| 2,047,554 | Fischer | July 14, 1936 |
| 2,070,247 | Weingand et al. | Feb. 9, 1937 |
| 2,161,561 | Dalton | June 6, 1939 |
| 2,227,682 | Wade | Jan. 7, 1941 |
| 2,337,927 | Reichel et al. | Dec. 28, 1943 |
| 2,346,187 | Reichel | Apr. 11, 1944 |
| 2,409,521 | Wiley | Oct. 15, 1946 |
| 2,422,953 | Davis et al. | June 24, 1947 |
| 2,423,260 | Slaughter | July 1, 1947 |